US009293079B2

(12) United States Patent
Bolas et al.

(10) Patent No.: US 9,293,079 B2
(45) Date of Patent: Mar. 22, 2016

(54) CONTROL OF AMBIENT AND STRAY LIGHTING IN A HEAD MOUNTED DISPLAY

(71) Applicants: Mark Bolas, Los Angeles, CA (US); J. Adam Jones, Seneca, SC (US); David M. Krum, Arcadia, CA (US)

(72) Inventors: Mark Bolas, Los Angeles, CA (US); J. Adam Jones, Seneca, SC (US); David M. Krum, Arcadia, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 0 days.

(21) Appl. No.: 14/216,152

(22) Filed: Mar. 17, 2014

(65) Prior Publication Data
US 2014/0267460 A1    Sep. 18, 2014

Related U.S. Application Data

(60) Provisional application No. 61/800,866, filed on Mar. 15, 2013.

(51) Int. Cl.
G09G 3/22        (2006.01)

(52) U.S. Cl.
CPC ........................................ G09G 3/22 (2013.01)

(58) Field of Classification Search
None
See application file for complete search history.

(56) References Cited

U.S. PATENT DOCUMENTS

| 5,508,849 | A * | 4/1996 | Goodell ........................ 359/793 |
| 8,957,835 | B2 | 2/2015 | Hoellwarth |
| 2002/0099257 | A1 | 7/2002 | Parker et al. |
| 2013/0113973 | A1 * | 5/2013 | Miao ........................ 348/333.01 |
| 2014/0268356 | A1 | 9/2014 | Bolas et al. |

OTHER PUBLICATIONS

USPTO, Office Action dated May 19, 2015, for U.S. Appl. No. 14/216,220, entitled "Dynamic Field of View Throttling as a Means of Improving User Experience in Head Mounted Virtual Environments," filed Mar. 17, 2014, published as US PGPub 2014/0267460 A1.

* cited by examiner

Primary Examiner — Kenneth B Lee, Jr.
(74) Attorney, Agent, or Firm — McDermott Will & Emery LLP

(57) ABSTRACT

A head mounted display (HMD) for viewing a virtual environment generally include a flat display (FD), lenses for focusing on the FD, and a housing to enclose the FD and lenses. The housing is generally opaque to block out all external light, so the viewer only sees light from the FD. By making a portion or all of the housing translucent or transparent, ambient light and other external light can be seen by the viewer, providing additional visual cues and a larger perceived field of view. Additionally, other people can see light from the FD. The lenses are configured to view the FD and parts of the translucent housing.

17 Claims, 10 Drawing Sheets

CONTROL OF AMBIENT AND STRAY LIGHTING IN A HEAD MOUNTED DISPLAY

CROSS-REFERENCE TO RELATED APPLICATION

This application is based upon and claims priority to U.S. provisional patent application 61/800,866 entitled "Control of Ambient and Stray Lighting in a Head Mounted Display," filed Mar. 15, 2013, the entire content of which is incorporated herein by reference.

STATEMENT REGARDING FEDERALLY SPONSORED RESEARCH

This invention was made with government support under Grant No. W911 NF-04-D-0005, awarded by the Army Research Office. The government has certain rights in the invention.

BACKGROUND

Head Mounted Displays or Head Coupled Displays for Virtual Reality (HMD) typically are composed of a flat display (FD), such as an LCD panel, that is viewed by a user through magnifying optics (optics) that are offset a distance from the FD. This arrangement is typically surrounded by a mechanical enclosure or housing which is designed from an optically occluding material that will block light from the natural environment so that the optics magnify the light from the FD, and not the natural environment, and so that light from the FD is not visible through the sides of the enclosure. The internal portion of the enclosure may also be coated or made from a dark material or treated or otherwise designed to not intentionally reflect internally light emanating from the FD. An HMD can be attached to the user's head, while a head coupled display can be held to the user's eyes, similar to binoculars, without directly attaching to the user's head.

SUMMARY

Ambient light is used to create a larger perceptual field of view in a Head Mounted Display (HMD). The technique may be of use to emerging HMD vendors. Others try to block all stray light. This invention uses it by controlling it.

While counterintuitive, this invention has found that there are advantages to breaking the rules of prior approaches and instead to carefully specify the design of the housing in such a way as to control and harness the reflection and diffusion of light from the environment and the FD.

In one implementation, virtual environment viewing device comprises a display having a display area, an optics component oriented towards the display and having a field of view, and a translucent housing connected to the display and the optics, wherein the field of view is configured to include the display area and a portion of the translucent housing.

In another implementation, stereoscopic head mounted display comprises a display configured to display a left image and a right image, a left optics component oriented towards the left image, a right optics component oriented towards the right image, a housing connected to the display, the left optics component, and the right optics component, wherein the left optics component is configured to provide a first view of the left image and a first portion of the housing and the right optics component is configured to provide a second view of the right image and a second portion of the housing.

In yet another implementation, head mounted display comprises a display for viewing a virtual environment, an optics component oriented towards the display, and a housing connected to the display and the optics component, wherein an exterior portion of the housing is capable of being illuminated from an interior of the housing by the display.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
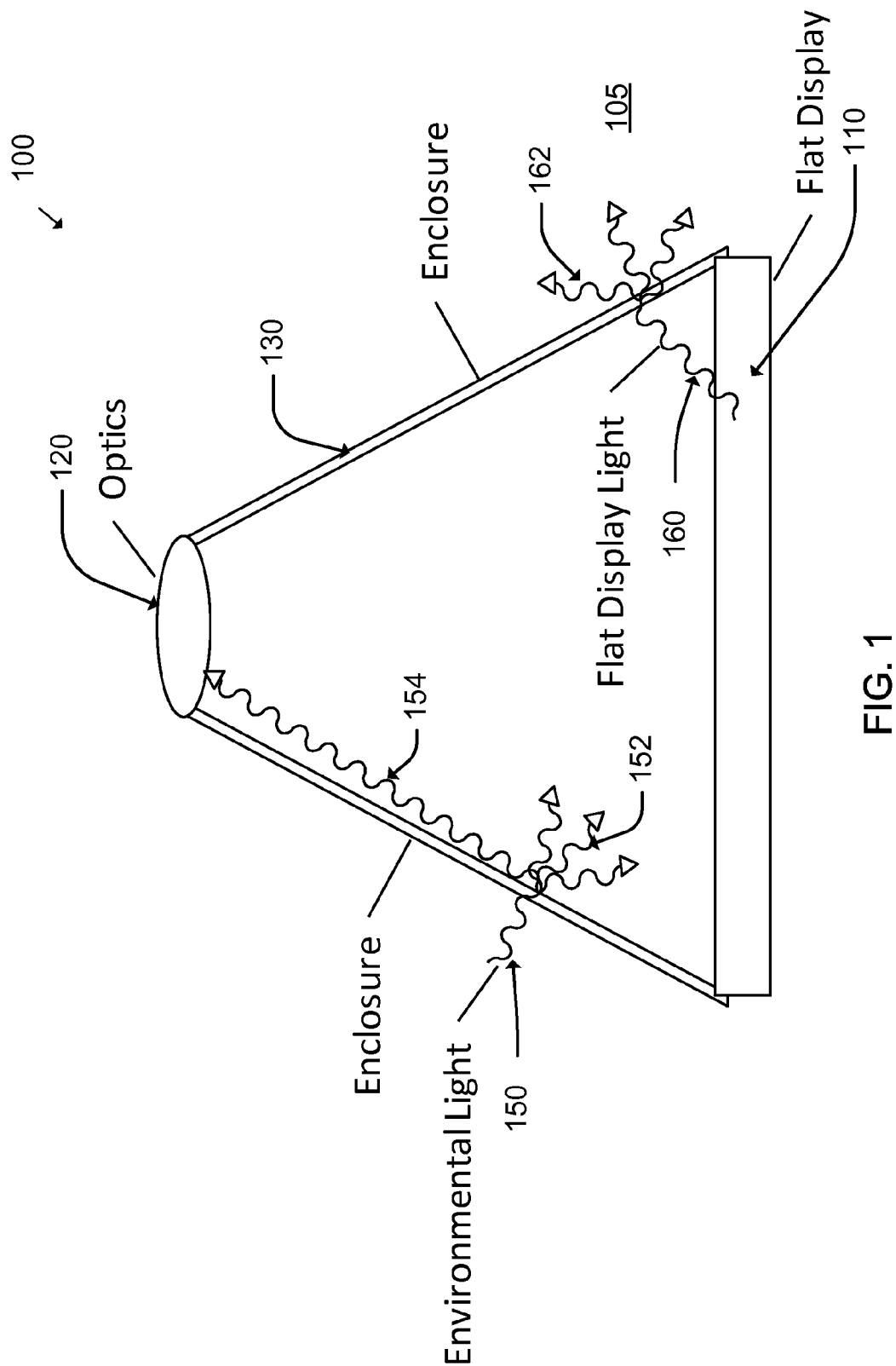
FIG. 1 illustrates a virtual environment viewing device having a translucent enclosure according to example aspects of the present disclosure.

FIG. 1 illustrates a virtual environment viewing device 100 including a display 110, an optics component 120, and a housing or enclosure 130. The display 110 may be a flat display (FD), a stereoscopic display, an LCD display, or other display. The optics component 120 may be a lens, or a pair of lenses for stereoscopic vision, or other optical viewing instrument, or may be a hollow portion or portions of the housing 340, and is oriented towards the display 110. If light is allowed to diffusely transmit through the enclosure 130, and the optics component 120 is designed to include such light, the user may be able to see environmental light 150 from the natural environment, which is diffusely transmitted through the enclosure 130 into the peripheral region of the user's view through the optics component 120. This diffuse, transmitted light or diffused light 154 can improve the experience of using an HMD as it gives the user a feeling of being more aware of the natural environment and potentially gives the impression of a larger viewing angle. Furthermore, allowing display light 160 from the display 110 to be diffusely transmitted out to the environment 105, has the potential advantage that it allows other people to get a general feeling for what the user of the virtual environment viewing device 100 is seeing. For example, an explosion might be seen by the user of the virtual environment viewing device 100 as a bright white flash, while others in the room would see the outside of the virtual environment viewing device 100 quickly glowing bright. The sides of the enclosure 130 may be curved or bowed inward or outward. The display 110 may also include flexible, curved, or other similar display technologies.

Figure 2:
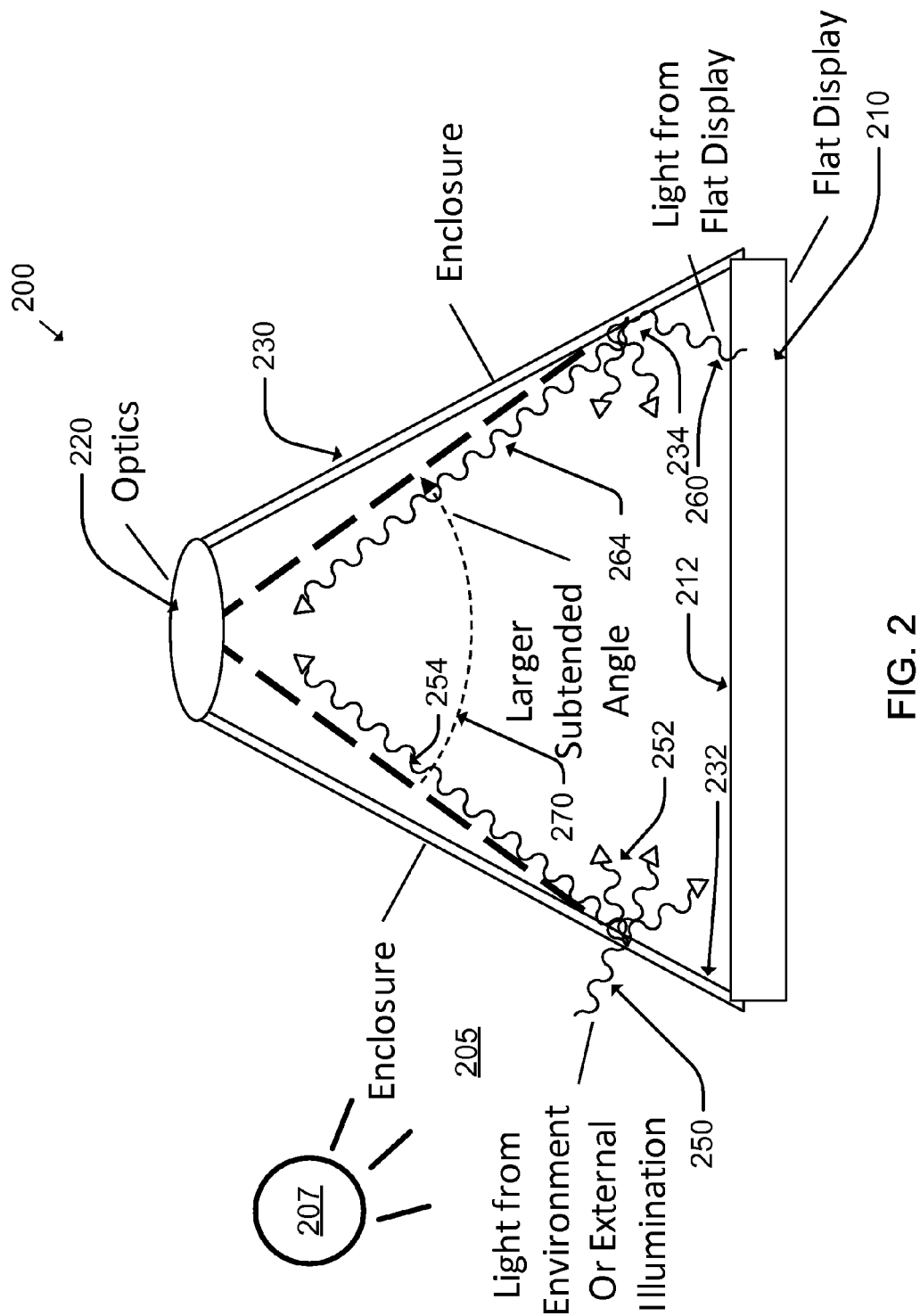
FIG. 2 illustrates a virtual environment viewing device having a translucent enclosure according to example aspects of the present disclosure.

While counterintuitive, there is an advantage to allowing light to internally reflect off and or glow from the enclosure when coupled with optics designed to take advantage of such light. FIG. 2 illustrates a virtual environment viewing device 200 including a display 210, an optics component 220, and an enclosure 230. The display 210, the optics component 220, and the enclosure 230 may correspond to the display 110, the optics component 120, and the enclosure 130, respectively. If the optics component 220 is designed to have a field of view (FOV) 270 that not only includes a display area 212 of the display 210, but also a portion of the internal surfaces 232 of the enclosure 230, then allowing display light 260 from the display 210 to internally reflect off, and or glow from, portions 234 of the enclosure 230, reflected light 264 has the potential advantage of actually or subjectively giving the user the impression of a larger viewing angle, providing a more immersive experience. By diffusing external illumination 250 from the natural environment 205, and allowing diffused light 254 to reach the user, the user is given perceptual cues that they see a larger viewing angle but they are not given recognizable imagery from the natural environment 205, as it has been diffused.

In one implementation, the enclosure 130 or 230 is made from an optically translucent material and the optics component 120 or 220 is designed to have a field of view that not only includes the display area 212, but also portions of internal surfaces 232 of the enclosure 230. For example, one implementation may utilize natural ABS filament in a rapid prototyping printer. This plastic is a light cream color and allows the diffuse transmission and reflection of light. Other translucent materials may be used with varying amounts of diffuse transmission and reflection of light from the natural environment 205 and the display 210. In this implementation, the optics component 220 may comprise lenses that subtend an angle approximately 15% greater than the angle that would be subtended by the display 210 alone. In other implementations, the optics component 220 may subtend the angle by other appropriate amounts, including less than 15%, or greater than 15% approaching the limit of human visual perception.

In addition to natural light, light emitting devices such as an electro luminescent panel or light emitting diodes or similar could be added to the exterior of a housing to provide light if the HMD is being used in a dark environment or in any environment in which it is desired to control such lighting. In FIG. 2 this external illumination 250 may comprise light from an external light source or light emitting device 207 and would serve the same role as light from the natural environment 205. The light emitting device 207 may be driven at a constant brightness, or modulated to reflect changes including dramatic effects in the virtual worlds typically seen on HMDs. The light emitting device 207 may also be located inside the housing.

Figure 3:
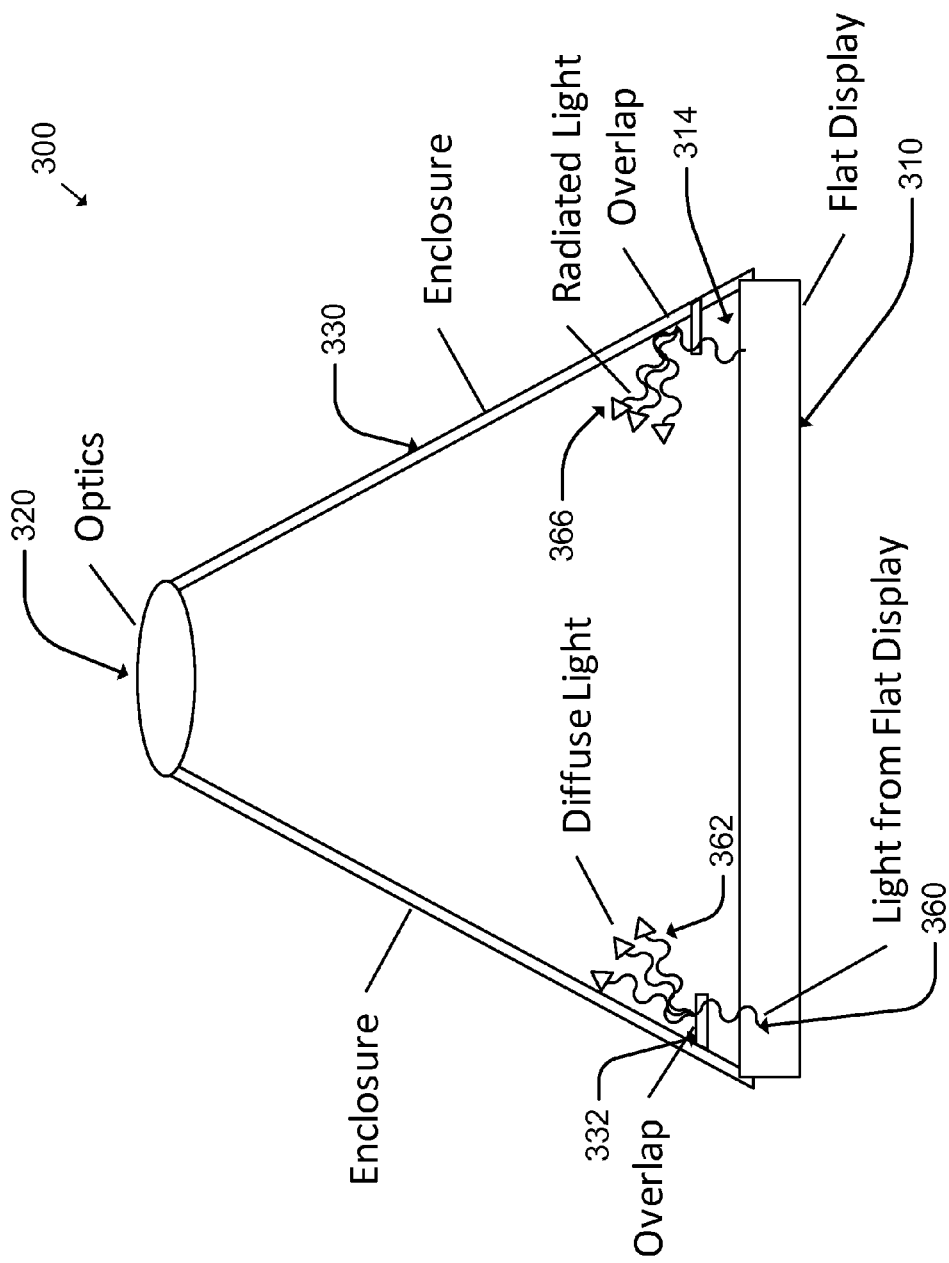
FIG. 3 illustrates a virtual environment viewing device having overlaps in the enclosure according to example aspects of the present disclosure.

FIG. 3 illustrates another implementation of a virtual environment viewing device 300, which includes a display 310, an optics component 320, and an enclosure 330. The display 310, the optics component 320, and the enclosure 330 may correspond to similarly numbered elements in FIGS. 1 and 2. Unlike FIG. 2, where the enclosure 230 meets the edges of the display 310 exactly, the enclosure 330 further includes overlaps 332, which partially cover outer edges 314 of the display 310 so as to capture and radiate and re-radiate display light 360 due to the translucent properties of the material of the overlaps 332. Display light 360 from the display 310 is diffused through the overlaps 332, producing diffuse light 362. Display light 360 and/or diffuse light 362 may be radiated off the enclosure 330, producing radiated light 366. The overlaps can be offset from the display as shown, or touch the display.

Figure 4:
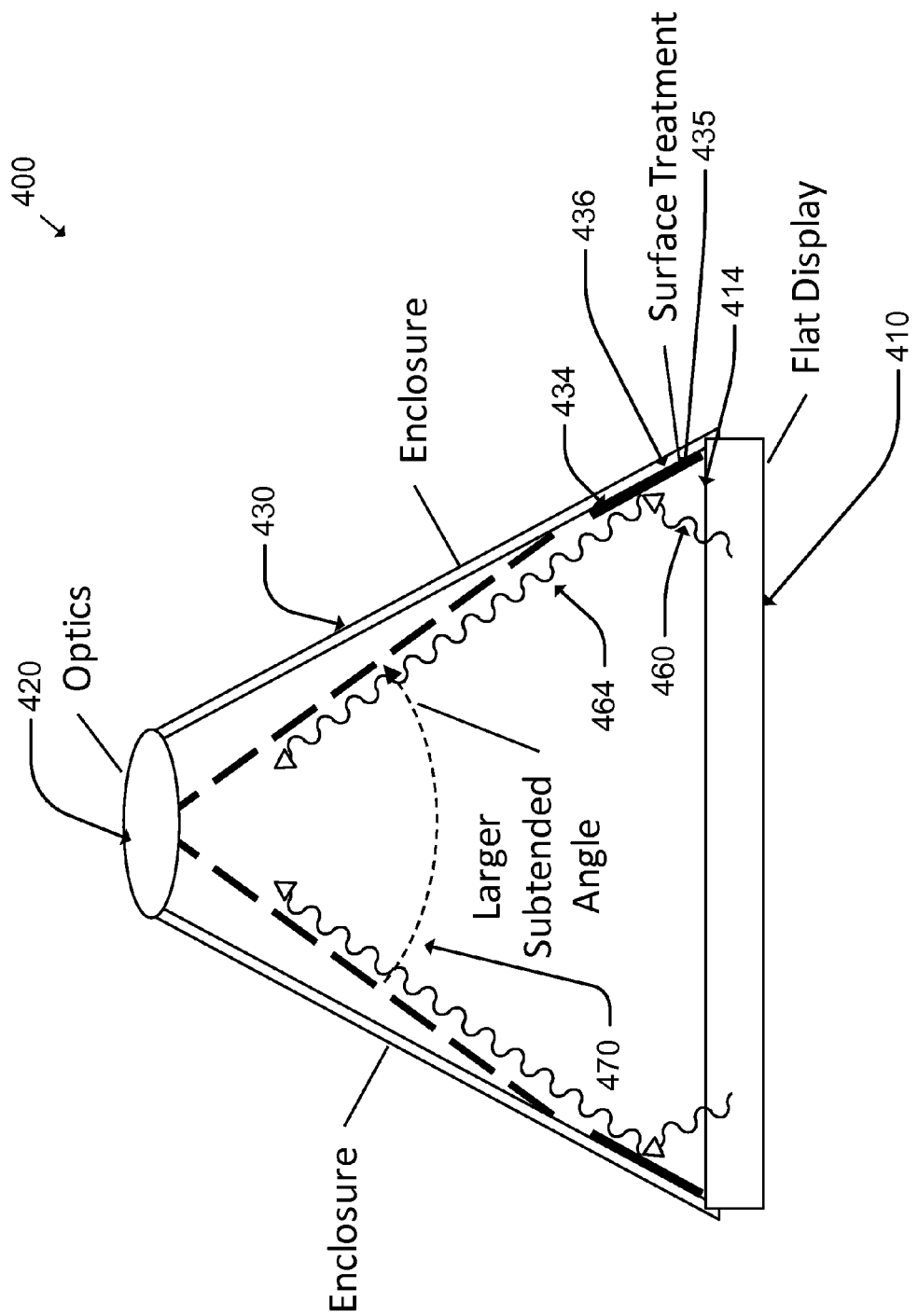
FIG. 4 illustrates a virtual environment viewing device having an enclosure with surface treatments according to example aspects of the present disclosure.

FIG. 4 illustrates another implementation of a virtual environment viewing device 400, which includes a display 410, an optics component 420, and an enclosure 430. The display 410, the optics component 420, and the enclosure 430 may correspond to similarly numbered elements described above. In FIG. 4, at least a portion of an interior surface 434 of the enclosure 430 may be coated or made with a material that diffusely reflects light from the display 410. Treatment is made to a portion 436 of the interior surface 434 that is nearest to outer edges 414 of the display 410 so that stray and reflected light is minimized while maintaining the reflected light advantage. For example, a surface treatment 435 may be a narrow band of paper can be adhered to the lower portion 436 of the enclosure that is nearest to the display 410 such that light 460 from the outer edges 414 of the display 410 is diffusely reflected, thus providing a glow of light or diffused light 464 that diffusely approximates the image seen at the very outer edges 414 of the display 410. The optics component 420 is designed to subtend an angle 470 that includes the surface treatment 435. The housing 430 may be made from either a translucent or non-translucent material.

Figure 5:
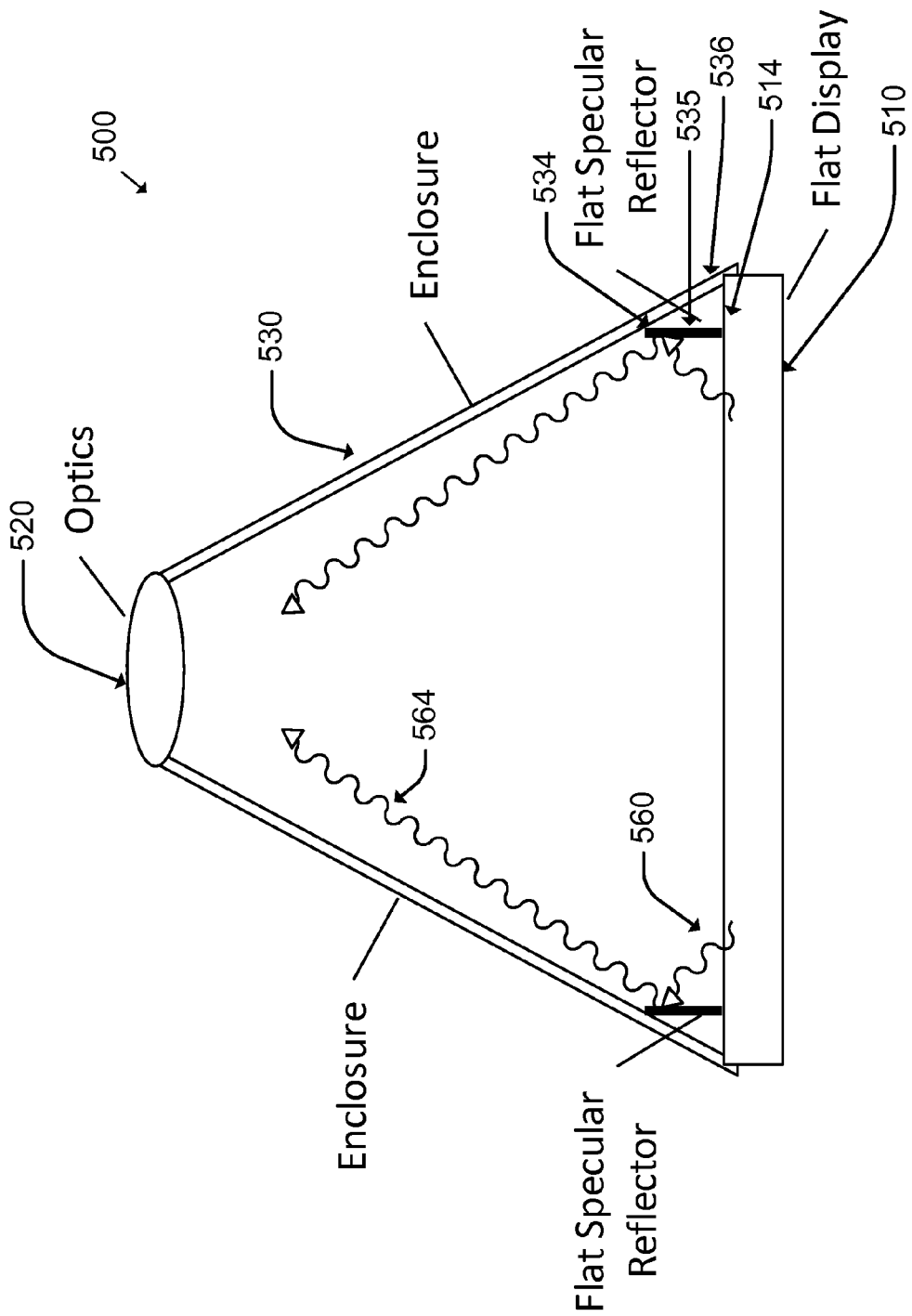
FIG. 5 illustrates a virtual environment viewing device having reflectors according to example aspects of the present disclosure.

FIG. 5 illustrates another implementation of a virtual environment viewing device 500, which includes a display 510, an optics component 520, and an enclosure 530. The display 510, the optics component 520, and the enclosure 530 may correspond to similarly numbered elements described above. In one implementation, a portion of the interior portion of the housing may be made with a material that specularly reflects light from the FD. In FIG. 5, a band 535 made of mirrored material may be placed along an interior surface 534 of a portion 536 of the enclosure 530 that is nearest to an outer edge 514 of the display 510 such that light 560 from the outer edge 514 of the display 510 is specularly reflected. The term specularly is meant to mean light that is reflected in a specular, or mirror-like, fashion. This specular band 535 can shaped to enable optical effect beyond a linear reflection, for example it can be curved or bowed to greater exaggerate the apparent field of view by magnifying a portion of the outer edge 514 of the display 510 that can be seen through the field of view of the optics component 520. This band 535 may also be designed to be partially specular or partially diffuse. This band 535 may also be made from materials that do not preserve a mirror-like image but that have specular and other specular-like optical properties such as a reflective hologram. In addition, the housing 530 may be made from either a translucent or non-translucent material.

An advantage of some implementations is that graphics that are displayed do not necessarily need to be specially rendered to consider the optical characteristics that have been described, as the reflected light will naturally correspond with the light that is nearest to the outer edges of the FD, and this will typically produce advantages described. In other cases, further advantages can be achieved by specifically rendering imagery near the outer portions of the FD which can be designed to take advantage of the optical characteristics that have been described. For example, if it is desired to give the user the experience of an explosion taking place off in the periphery, then the FD can create a bright area near the edge of the FD such that the enclosure will glow with light in that adjacent area. Another example is to render a bright white border around the outside edge of the FD so that the user perceives a brightness around the outside of the FD's field of view. Another example is to render distorted imagery that considers the magnification properties of the described curved or bowed shape or other specular-like optical properties such as a reflective hologram.

Figure 6A:
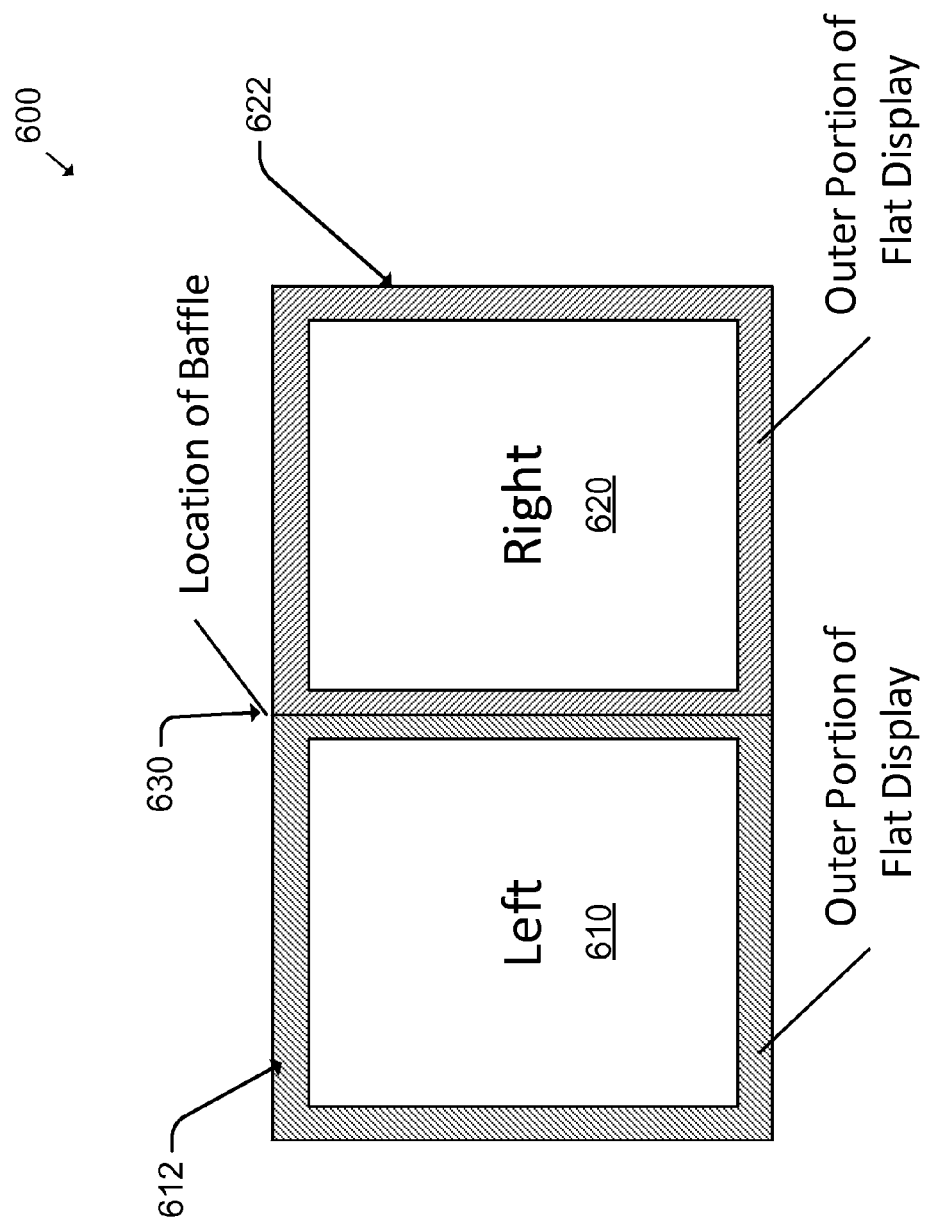
FIG. 6A illustrates a cross-sectional view of a virtual environment viewing device according to example aspects of the present disclosure.

Head mounted displays often require a physical baffle, added as a component of the housing, to be placed along the center of the housing between the left and right optics, to block imagery from the left portion of the FD from entering the right optics, and from the right portion of the FD from entering the left optics. FIG. 6A illustrates a cross-sectional view 600 of a virtual environment viewing device. A baffle 630 is disposed between a left display portion 610 and a right display portion 620. The baffle 630 may be made from translucent material such as natural ABS filament, or from diffusely reflecting material, or from specularly reflecting material, or from material treated in only a portion to be diffuse or specular or any of the other descriptions as described above so that the advantages described are retained. Light from the FD adjacent to the baffle 630 can be employed advantageously if the baffle 630 is intentionally designed to be translucent. The baffle 630 can then be considered as an exterior side of the housing such that the inventive concepts described herein may be applied to the baffle 630 as if it comprises an exterior side of the left display portion 610 and an exterior side of the right display portion 620. In addition, because the baffle 630 may be enclosed within an enclosure, as in FIG. 6C, additional mirrors or lights may be utilized such that the baffle 630 simulates a true exterior wall.

Figure 6B:
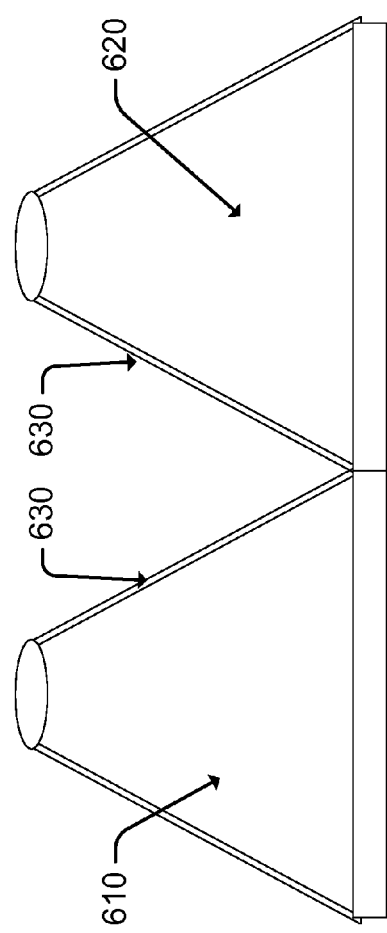
FIG. 6B illustrates a virtual environment viewing device having a baffle according to example aspects of the present disclosure.
Figure 6C:
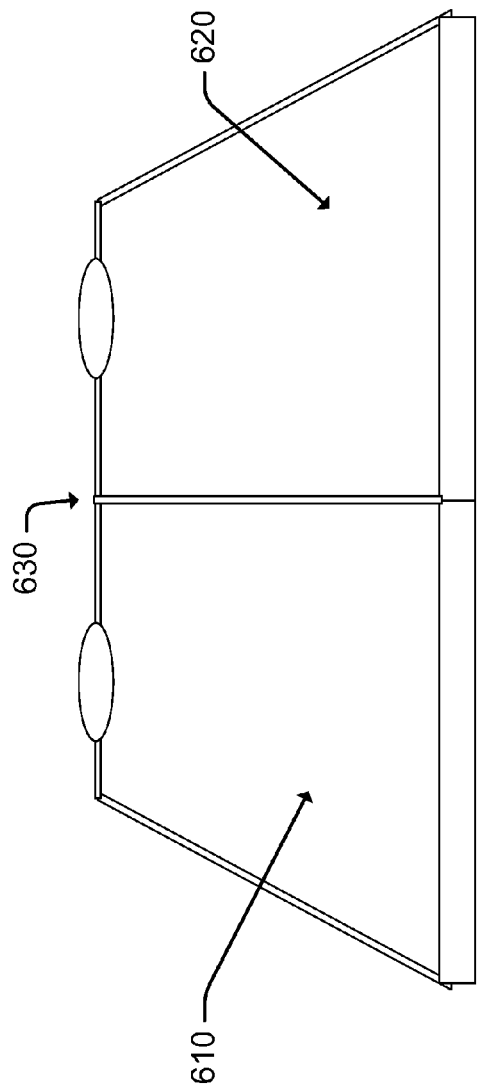
FIG. 6C illustrates another virtual environment viewing device having a baffle according to example aspects of the present disclosure.

Alternatively, the housing may be formed of two enclosures where the left display portion 610 may include one enclosure as described herein, and the right display portion 620 may include another enclosure as described herein such that the baffle 630 may comprise two adjoining exterior walls of the two enclosures, as in FIG. 6B. The baffle 630 then forms an exterior side of the left display portion 610 and an exterior side of the right display portion 620 such that the inventive concepts described herein bay me applied to the baffle 630.

In some head mounted display designs, an individual display, such as the left display portion 610 having a left outer portion 612 and a right display portion 620 having a right outer portion 622, are used for each eye. If a single display is used for both eyes, then the term 'outer portions of the FD' or similar also includes the inner portion of the display that is seen by either the left or right eye as the outer portion of that eye's field of view. In other words, the left outer portion 612 and the right outer portion 622 would include a center portion of the display between the left display portion 610 and the right display portion 620.

Figure 7:
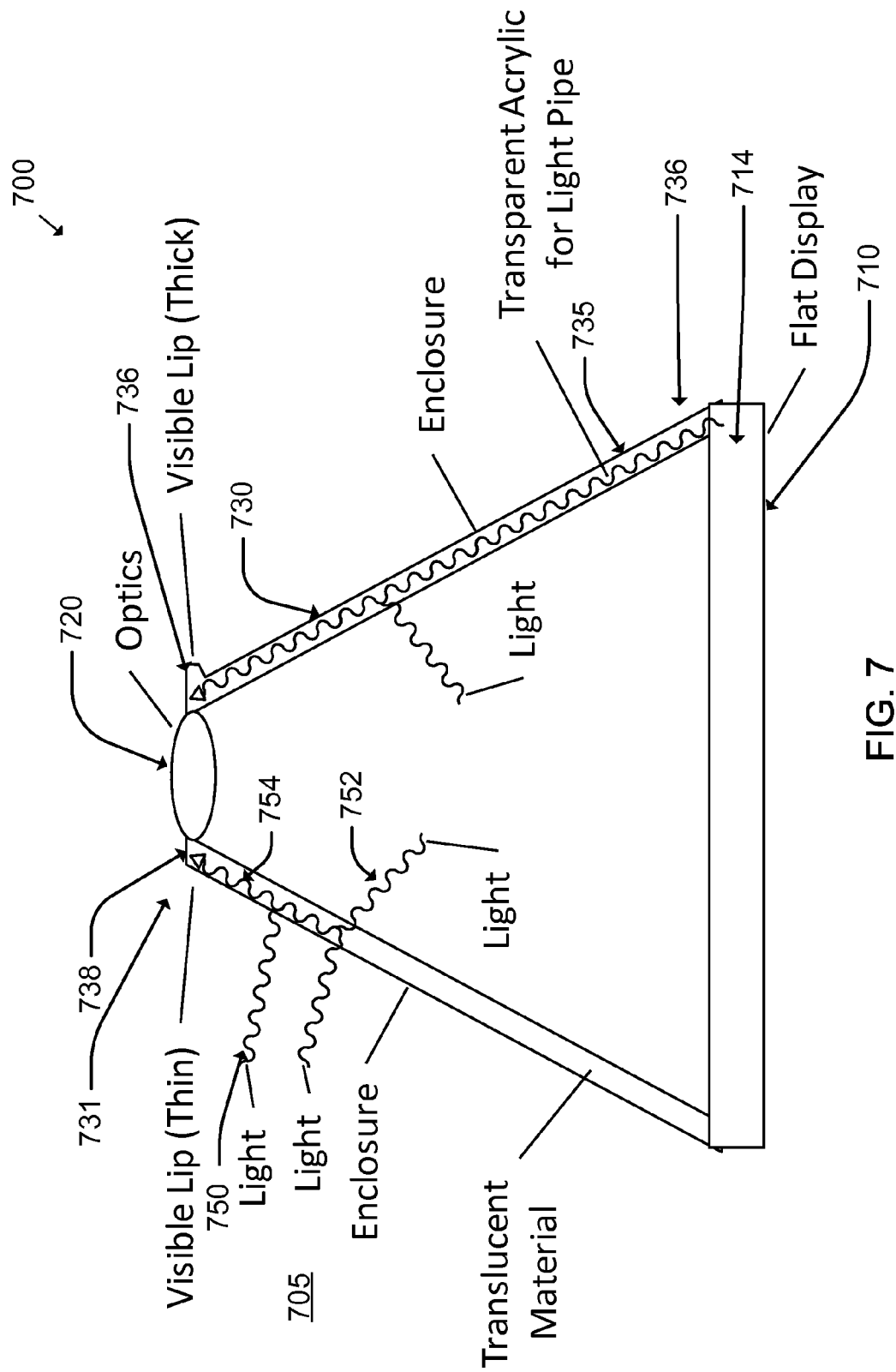
FIG. 7 illustrates a virtual environment viewing device having an enclosure with lips according to example aspects of the present disclosure.

FIG. 7 illustrates another implementation of a virtual environment viewing device 700, which includes a display 710, an optics component 720, and an enclosure 730. The display 710, the optics component 720, and the enclosure 730 may correspond to similarly numbered elements described above. While current technology employs flat displays, the term FD may also include flexible and curved displays. The display 710 may be flexible or curved. The enclosure 730 can also provide an apparent increase in the field of view by presenting the user with light that surrounds the optics component 720. As shown in FIG. 7, the virtual environment viewing device 700 utilizes the optical properties of the enclosure 730 as a light pipe, to collect light 752 from the display 710 as well as light 750 from the external environment 705 and have it travel up to an area 731 that immediately encircles the optics component 720, or a visible lip 738 around the optics component 720. The lip 738 may be formed with various sizes. A thinner or narrow lip 738, which may not substantially protrude from the enclosure 730, would deliver a small amount of light. A thicker lip 736, protruding from the enclosure 730 near the area 731, may also be made, so that it is wider than a minimum width needed to hold the optics component 720 so that an even greater area of light is presented to the user's eye. The enclosure 730 can be made of a transparent material such as Acrylic, which should be coated such that it acts as a light-pipe 735 to gather light from the outer portion of the FD and transmit it, as transmitted light 745, up to the visible lip 736. Clear material such as Acrylic can also be used to gather light 750 from the natural environment 705 and transmit it up to the lip 738 or down to lower portions 736 of the enclosure 730 that are near outer edges 714 of the display 710.

There may be space between the visible lip and the optics, so that the ring formed by the visible lip is larger in diameter or size than the optics.

Figure 8:
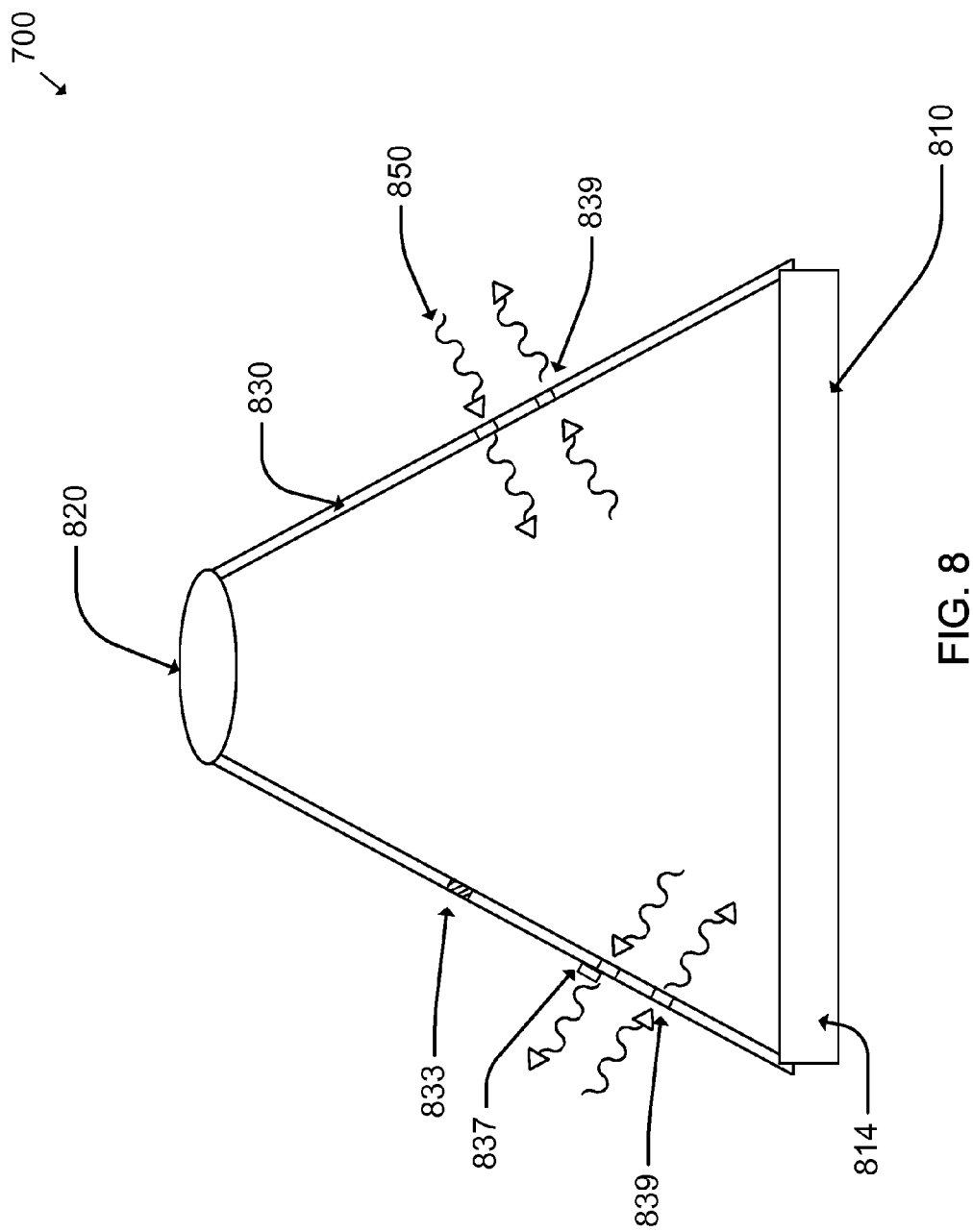
FIG. 8 illustrates a virtual environment viewing device having an enclosure with windows according to example aspects of the present disclosure.

FIG. 8 illustrates another implementation of a virtual environment viewing device 800, which includes a display 810, an optics component 820, and an enclosure 830. The display 810, the optics component 820, and the enclosure 830 may correspond to similarly numbered elements described above. The enclosure 830 includes one or more windows 839 that allows light 850 to pass through. The windows 830 may be located near outer edges 814 of the display 810 and may also be located elsewhere along the enclosure 830. Uncoated clear Acrylic may be used to provide a transparent window 830 in a portion or all of the enclosure, such as along the left and right sides, so that other people that are near the user of the device 800 can get a general feeling for what the user is seeing. Alternatively, the transparent windows 839 in a portion or all of the enclosure 830, such as along the left and right sides, may be manufactured as physical openings in the enclosure.

Any form of transparent windows 839 in a portion or all of the enclosure 830, may be manufactured to provide variable transmission of light into and out of the enclosure 830. This can be realized through physical coverings 837 that can occlude all, a portion, or no part of the transparent windows. These coverings could be manually operated by a user, or mechanically operated. The variable transmission of light through the enclosure 830 can also be realized through the use of materials 833 that darken or lighten, i.e. provide variable translucency and transparency, in response to various chemical, electrical, or light triggers.

Figure 9:
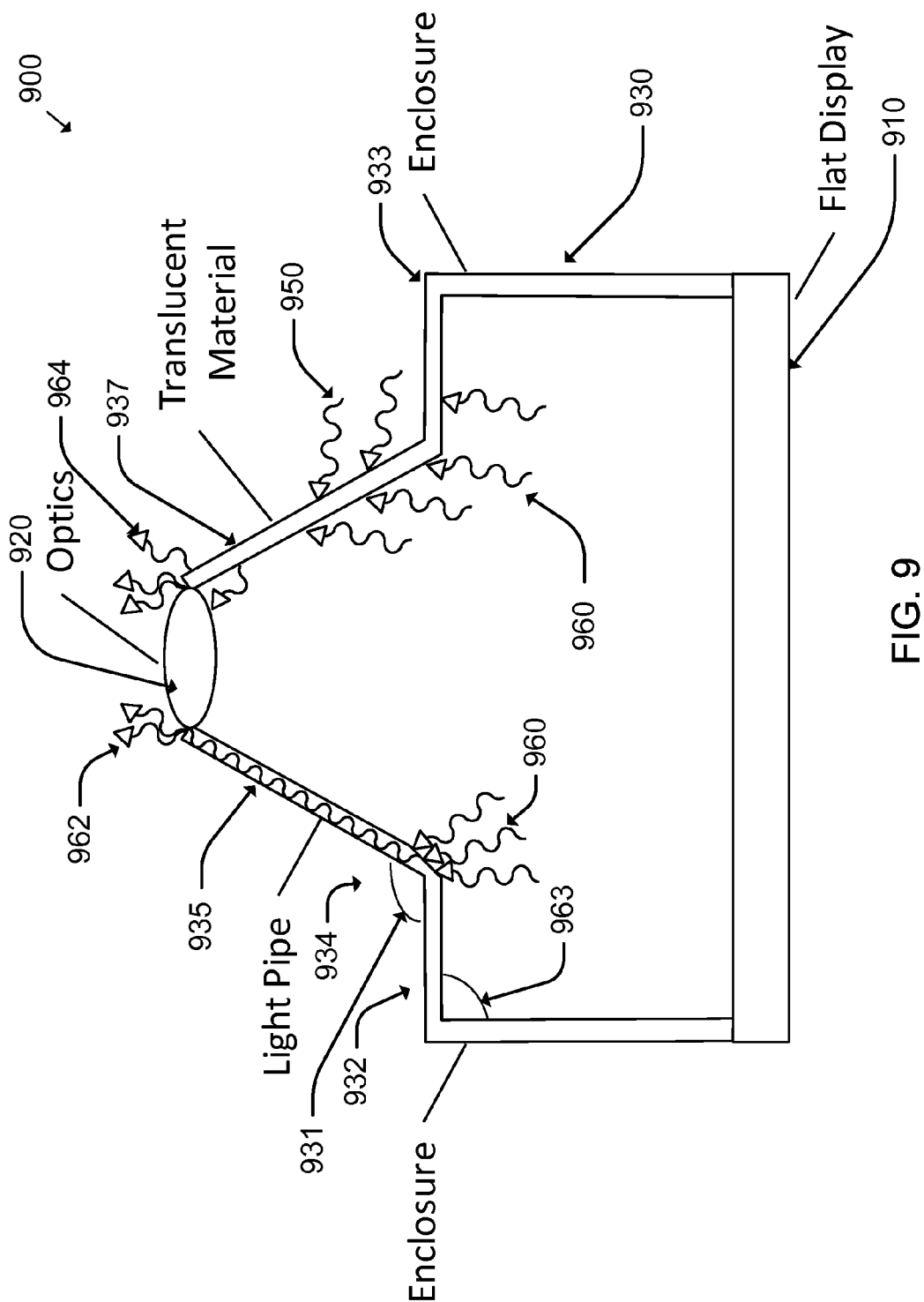
FIG. 9 illustrates a virtual environment viewing device having an enclosure with non-planar walls according to example aspects of the present disclosure.

FIG. 9 illustrates another implementation of a virtual environment viewing device 900, which includes a display 910, an optics component 920, and an enclosure 930. The display 910, the optics component 920, and the enclosure 930 may correspond to similarly numbered elements described above. The enclosure 930 may take different shapes, with the enclosure 930 acting to transfer light in the different ways described thus far, including but not limited to a translucent portion 937, and a light-pipe portion 935, as shown in FIG. 9. The enclosure 930 may have non-planar or curved walls 933. The enclosure 930 may have a protruding portion 932, forming an angle 963 of, for example, approximately 90 degrees or any other appropriate degree. The enclosure 930 may further have a complementary indent portion 934, forming an angle 931 of, for example, approximately 120 degrees or any other appropriate degree. The angles 963 and 931 may be determined to focus, collect, redirect, or otherwise transmit internal light 960 and external light 950, such as transmitted light 962 and diffused light 964.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A virtual environment viewing device comprising:
a display having a display area;
an optics component oriented towards the display and having a field of view; and
a translucent housing connected to the display and the optics,
wherein the field of view is configured to include the display area and a portion of the translucent housing,
wherein the translucent housing is configured to pass a light through the optics component at a subtended angle greater than a subtended angle of a display light from the display, and
wherein the subtended angle of the translucent housing is greater than the subtended angle of the display.

2. The virtual environment viewing device of claim 1, wherein an internal surface of the translucent housing has a differential surface.

3. The virtual environment viewing device of claim 1, wherein an internal surface of the translucent housing has a reflective surface.

4. The virtual environment viewing device of claim 1, wherein an internal surface of the translucent housing has a diffusive surface.

5. The virtual environment viewing device of claim 1, wherein the display in non-planar.

6. The virtual environment viewing device of claim 1, wherein the display comprises a multiple element display panel.

7. The virtual environment viewing device of claim 1, wherein a translucency of the translucent housing is variable.

8. The virtual environment viewing device of claim 7, wherein the translucent housing includes a translucent window configured to vary the translucency.

9. The virtual environment viewing device of claim 7, wherein the translucent housing includes an adjustable opening configured to vary the translucency.

10. The virtual environment viewing device of claim 7, wherein the translucency is controlled mechanically, electrically, chemically, or through light.

11. The virtual environment viewing device of claim 1, further comprising an optical element configured to modify external or internal light from the display.

12. The virtual environment viewing device of claim 1, further comprising a light emitting device.

13. The virtual environment viewing device of claim 12, wherein a brightness of the light emitting device is variable.

14. The virtual environment viewing device of claim 1, further comprising a light pipe configured to provide selective illumination.

15. The virtual environment viewing device of claim 1, further comprising a translucent baffle within the translucent housing.

16. A stereoscopic head mounted display comprising:
a display configured to display a left image and a right image;
a left optics component oriented towards the left image;
a right optics component oriented towards the right image;
a housing connected to the display, the left optics component, and the right optics component,
wherein the left optics component is configured to provide a first view, the right optics component is configured to provide a second view, the first view includes the left image and a first translucent portion of the housing, the second view includes the right image and a second translucent portion of the housing,
wherein the first and the second translucent portions of the housing are configured to pass a light through the left and the right optics component, respectively, at a subtended angle greater than a subtended angle of a display light from the display, and
wherein the subtended angle of the first and the second translucent portions of the housing are greater than the subtended angle of the display.

17. The head mounted display of claim 16, wherein the housing further comprises a translucent baffle between the left optics component and the right optics component.

* * * * *